United States Patent Office 3,201,493
Patented Aug. 17, 1965

3,201,493
ISOMERIZATION OF OLEFINIC COMPOUNDS
Erwin E. Meisinger, Elmhurst, and Herman S. Bloch, Skokie, Ill., assignors to Universal Oil Products Company, Des Plaines, Ill., a corporation of Delaware
No Drawing. Filed Sept. 25, 1963, Ser. No. 311,302
10 Claims. (Cl. 260—683.2)

This application is a continuation-in-part of our copending application, Serial No. 48,765, filed August 10, 1960 which is a continuation-in-part of our application Serial No. 847,054, filed October 19, 1959, said earlier applications being now abandoned.

This invention relates to a process for the conversion of organic compounds and particularly to a method for the isomerization of unsaturated organic conpounds such as olefinic hydrocarbons. More particularly yet the invention is concerned with a process for the selective isomerization of olefinic hydrocarbons utilizing certain catalytic compositions of matter.

The need for crude rubber, either natural or synthetic has increased at a tremendous rate inasmuch as rubber has attained a position of great importance as a material of modern manufacture, said importance being due to the diverse uses to which it may be put. In past years the amount of rubber obtained naturally from rubber trees has been sufficient to satisfy the requirements of modern living. However, the sources of natural rubber may be made unattainable to many countries due to emergencies which may arise. This condition was made apparent during the last war when many sources of natural rubber in the Far East, such as Southeast Asia, were cut off from the Western Hemisphere. When situations such as this arise, substitutes must be found to take the place of the missing natural rubber. Heretofore, synthetic rubbers such as the types producted by the reaction of butadiene and styrene (GR–S), butadiene and acrylonitrile (Buna-N), butadiene and isobutylene, Thiokol rubber, silicone rubber, neoprene rubber, etc., have been prepared. However, these products have usually been inferior to natural rubber in many of the necessary properties when in the vulcanized, elastic state.

A diolefinic hydrocarbon such as isoprene may be caused to polymerize stereoselectively to a rubbery product similar in many respects to the natural Hevea type rubber. The uses of such a rubber in articles of manufacture are many and varied, being too numerous to list in their entirety. A few representative uses are, for example, raw rubber which may be used in the shoe industry for the production of crepe soles for shoes, for erasers, adhesive cements and in the fabrication of gummed fabrics such as, for example, rubber cloaks; vulcanized rubber products which will include bumpers, buffers, vehicle tires, shock- and sound-proof articles, rubber bands, stoppers, stamps, sponges, elastic thread, belts, packing materials for machine construction, installation, etc.; and hard rubber which may be used as a suitable material for combs, tubing, fountain pens, dental goods, etc.

Therefore, as hereinbefore set forth, the need for a diolefinic hydrocarbon such as isoprene is greatly magnified, said compound assuming a greater importance than heretofore known for the production of such a rubber as the hereinabove mentioned Hevea type.

Organic compounds such as olefinic hydrocarbons and, particularly, propylene may be converted by a polymerization process to form a dimer thereof, namely, 2-methyl-2-pentene which is an intermediate in the preparation of isoprene, the final product being obtained by the demethanation of the propylene dimer. This isomer of methylpentene gives better yields of isoprene on demethanation than other isomers, for example 2-methylpentene-1 or 4-methylpentene-1, and consequently it is of advantage to be able to isomerize these isomers to 2-methylpentene-1 without skeletal isomerization. Polymers which contain unsaturation in certain positions of the chain may be used for motor fuels such as gasoline and as intermediates in the preparation of surface-active agents or solvents such as alcohols, alkyl aromatics, amines, etc., the position of the double bond or ethylenic linkage in the olefin chain being a determining factor as to the efficiency of the olefin in its intermediate function.

It is, therefore, an object of this invention to provide a process for isomerizing organic compounds to form isomers thereof which find a wide variety of uses in the chemical field.

Another object of this invention is to provide a process for obtaining desired olefinic hydrocarbon isomers by a selective isomerization process utilizing certain catalytic compositions of matter.

Taken in its broadest aspect, one embodiment of this invention resides in a process for the selective isomerization of an olefinic compound containing from 4 to about 20 carbon atoms per molecule which comprises treating said compound at isomerization conditions in the presence of a catalyst comprising an alkali metal amide disposed on a promoted metal oxide support, and recovering the isomerized olefinic compound.

A further object of this invention is found in a process for the selective isomerization of an olefinic hydrocarbon containing from 4 to about 20 carbon atoms per molecule which comprises treating said hydrocarbon at a temperature in the range of from about 0° to about 200° C. and at a pressure in the range of from about atmospheric to about 200 atmospheres in the presence of a catalyst comprising an alkali metal amide disposed on a high surface area substantially anhydrous alumina support which has been promoted with a compound selected from the group consisting of the alkali metal salts, alkali metal hydroxides, alkaline earth metal salts and alkaline earth metal hydroxides and calcined.

Yet another object of this embodiment is found in a process for the selective isomerization of an olefinic hydrocarbon containing from 4 to about 20 carbon atoms per molecule which comprises treating said hydrocarbon at a temperature in the range of from about 0° to about 200° C. and at a pressure in the range of from about atmospheric to about 200 atmospheres in the presence of a catalyst comprising potassium amide disposed on a substantially anrydrous alumina having a surface area of from about 25 to about 500 square meters per gram which has been promoted with a compound selected from the group consisting of the alkali metal salts, alkali metal hydroxides, alkaline earth metal salts and alkaline earth metal hydroxides and calcined.

A specific embodiment of this invention resides in a process for the selective isomerization of 2-methyl-1-pentene which comprises treating said 2-methyl-1-pentene at a temperature in the range of from about 0° to about 50° C. and at atmospheric pressure in the presence of a catalyst comprising potassium amide disposed on a lithiated gamma-alumina support, and recovering the desired 2-methyl-2-pentene.

Other objects and embodiments referring to alternative olefinic hydrocarbons and to alternative catalytic compositions of matter will be found in the following further detailed description of the invention.

As hereinbefore set forth, it has now been discovered that certain catalytic compositions of matter of a type hereinafter set forth in greater detail may be utilized to effect selective isomerization of olefinic hydrocarbons, particularly those hydrocarbons which contain from 4 up to about 20 carbon atoms. The particular catalytic compositions of matter will act to shift the double bond of these unsaturated compounds usually to a more centralized position in the chain without further polymerization of the olefin, said isomerization involving only the shift of the double bond without carbon skeleton rearrangement. This selective isomerization is especially true of olefinic compounds containing from 6 to about 20 carbon atoms or more. Examples of olefinic hydrocarbons which may undergo isomerization in the presence of these catalysts include butene-1, 2-methylbutene-1, pentene-1, 2-methyl-1-pentene, hexene-1, 2-methyl-1-hexene, heptene-1, heptene-2, the straight chain and alkyl substituted octene-1, octene-2, nonene-1, nonene-2, decene-1, decene-2, undecene-1, dodecene-1, tridecene-1, tetradecene-1, pentadecene-1, hexadecene-1, heptadecene-1, octadecene-1, nonadecene-1, eicosene-1, etc.

The isomerization process of the present invention is effected in the presence of a catalyst which possesses a high degree of isomerization activity. The catalyst comprises an alkali metal amide disposed on a promoted metal oxide support. The term "promoted," as used hereinbefore and hereinafter in the specification and also in the appended claims, will refer to a pretreatment of the metal oxide support with a salt or hydroxide of a metal selected from the group including alkali metals and alkaline earth metals such as lithium, sodium, potassium, rubidium, cesium, magnesium, calcium, strontium and barium. Of the alkali metal amides which are composited or disposed on the promoted metal oxide support, potassium and sodium are preferred inasmuch as said metals are relatively abundant, inexpensive, and exhibit high activity as compared with the other metals of the alkinous metal group (i.e., the group comprising alkali metals and alkaline earth metals) and potassium is especially preferred for the same aforesaid reasons.

In preparing such catalysts, the alkali metal amides are disposed on a support in a quantity ranging from about 2 to about 20% or more by weight based on the support. The preferred supports which are utilized in the process of the present invention are those which are relatively or substantially free from water. In most cases, this freedom from water of the support is achieved by a precalcination treatment of said support. This precalcination is carried out at a relatively high temperature in the range of from about 400° to about 700° C. and for a time sufficient to effect substantial removal of adsorbed or combined water from the support. The time required will vary depending upon the support, and in addition depending upon whether the water is in a combined or in merely a physically adsorbed form. In addition to the necessity for freedom from water, the support is characterized by the necessity for having a high surface area. By the term high surface is meant a surface area measured by surface adsorption techniques within the range of from about 25 to about 500 or more square meters per gram and preferably a support having a surface area of approximately 100 to 300 square meters per gram. For example, it has been found that certain low surface area supports such as alpha-alumina which is obviously free from combined water and which has been freed from adsorbed water is not a satisfactory support for the alkali metal amides in the preparation of catalysts for use in the process of this invention. Alpha-alumina is usually chaarcterized by a surface area ranging from about 10 to about 25 square meters per gram. In contrast, gamma-alumina which has a surface area ranging from about 100 to about 300 square meters per gram, and which has been freed from adsorbed water and which contains little combined water, is a satisfactory support. Celite, a naturally occurring mineral, after precalcination, is not a satisfactory support. Celite has a surface area of from about 2 to about 10 square meters per gram. Likewise alkali metal amide dispersions on sand or on other low surface area silica are not satisfactory catalysts in this process. In addition, aluminas which contain combined water but which have relatively high surface areas are also not satisfactory supports. Such aluminas include dried alumina mono-hydrates which have not been sufficiently calcined to remove combined water and to form gamma-alumina. These alumina hydrates may have surface areas ranging from 50 to about 200 square meters per gram but because they contain combined water are not satisfactory supports. Particularly preferred supports for the preparation of catalysts for use in the process of this invention include high surface area crystalline alumina modifications such as gamma-, eta- and theta-alumina, although these are not necessarily of equivalent suitability. However, as is obvious from the above discussion the limitation on the use of any particular support is one of freedom from combined or adsorbed water in combination with the surface area of the support selected. In addition to the aforementioned types of support another type is that which is prepared from an alkali aluminate such as sodium aluminate, potassium aluminate, etc., from which a substantial majority of the alkali metal has been removed leaving only the alumina with a relatively minor amount of the alkali metal present.

The desired support, preferably, although not necessarily, gamma-, eta- or theta-alumina is pretreated with a promoter in any manner. One method of impregnating the solid support is to treat said support with an alkali metal hydroxide such as lithium hydroxide, potassium hydroxide, sodium hydroxide, etc., and thereafter calcine at a temperature, usually in the range of from about 500° to about 700° C. whereby said hydroxide is thoroughly dehydrated.

The novel catalyst of the present invention is then prepared by dissolving an alkali metal such as potassium in liquid ammonia and impregnating the promoted alumina with an ammonia solution of potassium amide, the potassium amide having been formed when the potassium reacted with the ammonia. Following this impregnation by the alkali metal amide in ammonia the excess ammonia is driven off and the catalyst is then ready for use in the desired conversion reaction. Examples of alkali metal amides which may be utilized include potassium amide, sodamide, lithium amide, rubidium amide, cesium amide, the preferred amides comprising sodamide and potassium amide due to their high activity as well as the relatively large amount of these metals available and the correspondingly lower cost of the same.

The process of this invention may be effected in any suitable manner and may comprise either a batch or continuous type operation. For example, when a batch type operation is used the olefinic compound to be isomerized is placed in an appropriate apparatus along with an inert solvent such as benzene, toluene, xylene, pentane, heptane, etc., if so desired, along with the catalytic composition of matter of the type hereinbefore set forth. The isomerization of the olefinic hydrocarbon is then effected at isomerization conditions. Generally speaking, the temperature will be in the range of from about 0° up to about 200° C. and pressures will range from atmospheric up to about 200 atmospheres, said pressure being sufficient to maintain a major portion of the olefinic hydrocarbon in the liquid phase. In the preferred embodiment of the invention the isomerization is usually effected at relatively low temperatures ranging from about 0° up to slightly above room temperature—to about 50° C.

It is also contemplated within the scope of this invention that the isomerization of the olefinic hydrocarbon may be effected in a continuous manner. For example, an olefinic hydrocarbon of less than the desired number of carbon atoms may be polymerized in the usual manner by passing said olefin over a predetermined polymerization catalyst at polymerization conditions, said conditions usually being at elevated temperatures and pressures, the temperature being in the range of from about 50° to about 300° C. or more and pressures being in the range from about 5 to about 250 atmospheres or more, the pressure again being dependent upon the feed stock, catalyst and temperature, said pressuring being sufficient to maintain a major portion of the said stock in the liquid phase. The polymerized olefin is then withdrawn from the polymerization zone, separated from any unreacted starting material and/or undesired reaction products by conventional means such as distillation, etc. and passed to the isomerization zone. The isomerization zone will be maintained at the proper operating conditions of temperature and pressure hereinbefore set forth and will contain a catalyst of the type hereinbefore set forth in greater detail. After a predetermined residence time the olefinic hydrocarbon, which has undergone selective isomerization, will be continuously withdrawn from the isomerization zone and passed to a separation zone wherein the isomerized hydrocarbons which have undergone a shift of the double bond to a more centralized position in the chain without further polymerization of the olefin and without any carbon skeleton rearrangement will be recovered. This recovery may be effected by any conventional means known in the art such as fractional distillation whereby the unisomerized olefinic hydrocarbons may be recycled back to the isomerization zone to form a portion of the feed stock being charged thereto. In this manner undesired olefinic hydrocarbons may be isomerized to form useful compounds. For example, butene-1 may be isomerized to butene-2, pentene-1 may be isomerized to pentene-2, 2,3-dimethyl-1-butene may be isomerized to 2,3-dimethyl-2-butene, 2-methyl-1-pentene may be isomerized to 2-methyl-2-pentene which is a precursor to isoprene, the latter compound, as hereinbefore set forth, being prepared by the demethanation of the former compound.

A particularly suitable type of continuous operation which may be herein utilized comprises a fixed bed operation in which the catalyst comprising an alkali metal amide disposed on a promoted metal oxide support is positioned as a fixed bed in the reaction zone and the feed stock comprising the olefinic compound is continuously charged to the reaction zone, said feed stock passing over said catalyst bed in either an upward or downward flow. Other continuous types of operations which may be used in this process include the compact moving bed type of operation in which the bed of catalyst and the olefinic hydrocarbon pass either concurrently or countercurrently to each other in the isomerization zone and the slurry type operation in which the catalyst is carried into the isomerization zone as a slurry in the olefinic hydrocarbon. In carrying out the process of this invention in a continuous manner, liquid hourly space velocities (the volume of liquid hydrocarbon charged to the reactor per volume of catalyst per unit of time), may be varied within a relatively wide range of from about 0.1 to about 20 or more, the preferred range being from about 0.1 to about 10. To eliminate any possible polymerization of the olefinic hydrocarbon which is undergoing a shift of the double bond to a more centralized position in the chain, particularly among the lower molecular weight olefins, the isomerization is usually carried out at a relatively low temperature and/or using higher liquid hourly space velocities.

The following examples are given to illustrate the process of the present invention which, however, are not intended to limit the generally broad scope of the present invention in strict accordance therewith.

EXAMPLE I

A catalyst for the conversion of hydrocarbons was prepared by treating gamma-alumina spheres which had been calcined at 550° C. prior to use with a lithium hydroxide solution, the final promoted gamma-alumina base containing about 0.5% of lithium based on the alumina. The promoted alumina spheres were then impregnated with potassium amide from a solution prepared by dissolving 12 g. of metallic potassium in 350 cc. of liquid ammonia and allowing the reaction to proceed until the blue color had disappeared. The alumina spheres were added with continuous stirring and the liquid ammonia was allowed to evaporate. The final catalyst contained approximately 20% potassium (in the form of its amide) based on the alumina.

The thus prepared catalyst was placed in a reaction zone and swept with nitrogen which had been dried by passage over high surface sodium followed by a liquid pentane wash to remove any trace of any residual ammonia which might still be present. The reactor tube containing the flushed catalyst was a standard ⅞″ inner diameter stainless steel tube surround by a block furnace provided with heating means. The propylene charge was passed through a high surface sodium containing drier operated at room temperature, and charged to the reactor tube. Normal pentane which served as an inert reaction solvent, was also pumped through a high surface sodium containing drier operated at a temperature of about 200° C. The propylene-n-pentane charge passed through the catalyst bed in a downflow direction, said reactor being maintained at a temperature of about 135–150° C. and at a pressure of about 1800 p.s.i.g. The product was withdrawn and charged to a depropenizing column following which the depropenized product was collected in a receiver maintained at wet ice temperature. The depropenized product comprising isomeric hexenes was analyzed and found to contain about 67% 2-methyl-2-pentene, 15% 2-methyl-1-pentene, 15% 4-methyl-1-pentene and 2% 4-cis-methyl-2-pentene.

The hexenes thus recovered were then charged in continuous flow to a reaction tube comprising a 1″ inner diameter stainless steel tube equipped with a water jacket. A catalyst similar to that described in the first paragraph above was placed in the reaction zone under high surface sodium dried nitrogen flow. The hexene was charged to said reactor which was maintained at a temperature above about 25° C. (room temperature) and a pressure of about 30 p.s.i.g. The results of three runs using this procedure are set forth in Table I below.

*Table I*

| Period | 1 | 2 | 3 |
|---|---|---|---|
| Pressure, p.s.i.g | | 30 | |
| Cat. Temp., ° C.: | | | |
| In | | 25 | |
| Max | | 25 | |
| Overall LHSV | 4 | 2 | 1 |
| Hexene Breakdown, GLC: | | | |
| 4-Methyl-1-pentene | 8.2 | 7.6 | 7.6 |
| 4-Methyl-cis-2-pentene | 1.3 | 1.3 | 1.3 |
| 2,3-Dimethyl-1-butene | 1.3 | 1.3 | 1.3 |
| 2-Methyl-1-pentene | 10.5 | 10.6 | 11.1 |
| 2-Methyl-2-pentene | 76.3 | 75.3 | 75.7 |
| Trans-2-Hexene | 1.3 | 1.5 | 1.1 |
| 3-Methyl-trans-2-pentene | | 0.6 | 0.4 |
| 3-Methyl-cis-2-pentene | 0.4 | 0.6 | 0.4 |
| 2,3-Dimethyl-2-butene | 0.8 | 1.2 | 1.1 |

It will be noted from the above table that an increase in the desired hexene isomer, that is 2-methyl-2-pentene from approximately 67% up to from 75 to 76% was obtained by passing the isomeric hexenes over a catalyst similar to that used for the dimerization, thereby causing a rearrangement of the isomers, whereby the double bond was shifted to a more centralized position, with substantially no rearrangement of the carbon skeleton, and the aforesaid isomer was obtained thereby in a greater yield than is obtained by a one-step dimerization process.

Alternatively the hexenes recovered from the dimerization step may be separated, the desired 2-methyl-2-pentene being recovered while the undesired isomers including 2-methyl-1-pentene, 4-methyl-1-pentene, etc., are charged to a second reactor or isomerization zone containing the above described catalyst for isomerization to the desired configuration.

EXAMPLE II

In this example a catalyst was prepared by processing a mixture of lithium nitrate treated alumina, which was thereafter calcined, liquid ammonia, potassium and a catalytic amount of ferric oxide in a manner similar to that set forth in Example I above. The catalyst thus produced was utilized in a process for the isomerization of a hexene.

The catalyst was charged to an isomerization zone under dry nitrogen following which n-pentane was used to fill the reactor liquid full and bring the pressure of the reactor to 200 pounds. The hexene fraction which contained 37.8 weight percent of 2-methyl-2-pentene, 26.6 weight percent of 2-methyl-1-pentene along with relatively small amounts of 4-methyl-cis-2-pentene, 3-methyl-1-pentene, 4-methyl-1-pentene, 4-methyl-trans-2-pentene and 2,3-dimethyl-1-butene was charged to the reactor maintained at a temperature of about 24° C. and a pressure of about 200 pounds per square inch. The hexene fraction was charged to the reactor at a liquid hourly space velocity of 0.5. The effluent from the reactor passed directly into a wet ice trap and from there into a Dry Ice trap. Most of the hydrocarbons condensed in the wet ice trap, the remainder condensed in the Dry Ice trap. The total product was combined and analyzed by GLC for hexene isomer distribution. The product which was recovered from this run analyzed at 84.7 weight percent of 2-methyl-2-pentene and only 6.7 weight percent of 2-methyl-1-pentene, the remainder comprising small amounts of the various isomers hereinabove set forth.

EXAMPLE III

In this example a catalyst which was prepared in a manner similar to that set forth in Example I above is placed in a reaction tube comprising a one inch inner diameter stainless steel tube equipped with a water jacket. Before placing 50 cc. of the catalyst in the tube the catalyst is subjected to drying by the action of high surface sodium dried nitrogen. The tube is flushed with n-pentane for a predetermined period of time following which the charge comprising butene-1 is added to the reactor. The reaction tube is maintained at operating conditions of 25° C. and a pressure of about 200 pounds per square inch, said butene-1 being charged at a liquid hourly space velocity of about 0.5. The isomerized butene is recovered and condensed and subjected to analysis, the major portion of the recovered product comprising butene-2.

EXAMPLE IV

In this example the catalyst which is prepared in a manner similar to that set forth in Example I above is placed in a reaction vessel after being subjected to the action of high surface sodium dried nitrogen. The reaction vessel is charged with n-pentane for a predetermined period of time. Following this the charge stock comprising dodecene-1 which has been dried by azeotropic distillation is charged to the reactor. The reactor is maintained at the proper operating conditions of temperature and pressure, namely, a temperature of 45-50° C. and a pressure of about 200 pounds per square inch. Upon completion of the residence time the reactor effluent is passed through a wet ice trap and a Dry Ice trap. The condensed product is combined and analyzed and will be found to contain a mixture of n-dodecenes comprising over 80% of isomers with internal double-bonds, i.e., dodecene-2, -3, -4, -5, and -6, with dodecene-2 present in the largest amount.

We claim as our invention:

1. A process for the selective isomerization of an olefinic hydrocarbon containing from 4 to about 20 carbon atoms per molecule which comprises treating said hydrocarbon at a temperature in the range of from about 0° to about 25° C. and at a pressure in the range of from about atmospheric to about 200 atmospheres in the presence of a catalyst comprising an alkali metal amide disposed on a high surface area substantially anhydrous alumina containing an alkali metal promoter.

2. A process for the selective isomerization of an olefinic hydrocarbon containing from 4 to about 20 carbon atoms per molecule which comprises treating said hydrocarbon at a temperature in the range of from about 0° to about 25° C. and at a pressure in the range of from about atmospheric to about 200 atmospheres in the presence of a catalyst comprising an alkali metal amide disposed on a high surface area substantially anhydrous alumina support which has been promoted with a compound selected from the group consisting of the alkali metal salts, alkali metal hydroxides, alkaline earth metal salts and alkaline earth metal hydroxides and calcined.

3. A process for the selective isomerization of an olefinic hydrocarbon containing from 4 to about 20 carbon atoms per molecule which comprises treating said hydrocarbon at a temperature in the range of from about 0° to about 25° C. and at a pressure in the range of from about atmospheric to about 200 atmospheres in the presence of a catalyst comprising an alkali metal amide disposed on a substantially anhydrous alumina having a surface area of from about 25 to about 500 square meters per gram and containing an alkli metal promoter.

4. A process for the selective isomerization of an olefinic hydrocarbon containing from 4 to about 20 carbon atoms per molecule which comprises treating said hydrocarbon at a temperature in the range of from about 0° to about 25° C. and at a pressure in the range of from about atmospheric to about 200 atmospheres in the presence of a catalyst comprising a potassium amide disposed on a substantially anhydrous alumina having a surface area of from about 25 to about 500 square meters per gram and containing an alkali metal promoter.

5. A process for the selective isomerization of an olefinic compound containing from 4 to about 20 carbon atoms per molecule which comprises treating said hydrocarbon at a temperature in the range of from about 0° to about 25° C. and at a pressure in the range of from about atmospheric to about 200 atmospheres in the presence of a catalyst comprising potassium amide disposed on a lithiated gamma-alumina support, and recovering the isomerized olefinic hydrocarbon.

6. A process for the selective isomerization of butene-1 which comprises treating said butene at a temperature in the range of from about 0° to about 25° C. and at atmospheric pressure in the presence of a catalyst comprising potassium amide disposed on a lithiated gamma-alumina support, and recovering the desired butene-2.

7. A process for the selective isomerization of 2-methyl-1-pentene which comprises treating said 2-methyl-1-pentene at a temperature in the range of from about 0° to about 25° C. and at atmospheric pressure in the presence of a catalyst comprising potassium amide disposed on a lithiated gamma-alumina support, and recovering the desired 2-methyl-2-pentene.

8. A process for the selective isomerization of dodecene-1 which comprises treating said dodecene-1 at a temperature in the range of from about 0° to about 25° C. and at atmospheric pressure in the presence of a catalyst comprising potassium amide disposed on a lithiated gamma-alumina support, and recovering n-dodecenes with internal unsaturation.

9. A process as set forth in claim 3 further characterized in that the alkali metal of said amide is sodium.

10. A process as set forth in claim 3 further characterized in that the alkali metal of said amide is lithium.

References Cited by the Examiner

UNITED STATES PATENTS 3,128,318    4/64    Meisinger et al. _____ 260—683.2

FOREIGN PATENTS 917,358    2/63    Canada.

ALPHONSO D. SULLIVAN, *Primary Examiner.*